United States Patent
Osamura et al.

(10) Patent No.: US 9,604,548 B2
(45) Date of Patent: Mar. 28, 2017

(54) DRIVING FORCE CONTROLLER FOR ELECTRIC VEHICLE

(71) Applicant: CALSONIC KANSEI CORPORATION, Saitama-shi, Saitama (JP)

(72) Inventors: Kensuke Osamura, Saitama (JP); Toshiyuki Iwahana, Saitama (JP); Mitsuo Hirata, Utsunomiya (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 0 days.

(21) Appl. No.: 15/112,761

(22) PCT Filed: Dec. 22, 2014

(86) PCT No.: PCT/JP2014/083854
§ 371 (c)(1),
(2) Date: Jul. 20, 2016

(87) PCT Pub. No.: WO2015/111341
PCT Pub. Date: Jul. 30, 2015

(65) Prior Publication Data
US 2016/0347201 A1    Dec. 1, 2016

(30) Foreign Application Priority Data
Jan. 22, 2014   (JP) ................. 2014-009415

(51) Int. Cl.
*B60L 15/20* (2006.01)
*B60L 3/12* (2006.01)

(52) U.S. Cl.
CPC ............. *B60L 15/20* (2013.01); *B60L 3/12* (2013.01); *B60L 2240/423* (2013.01); *B60L 2260/42* (2013.01); *B60Y 2200/91* (2013.01)

(58) Field of Classification Search
CPC ...... G06Q 40/00; F16H 61/662; B60W 20/10; B60W 10/06; B60W 10/08
See application file for complete search history.

(56) References Cited

U.S. PATENT DOCUMENTS 8,292,782 B2 * 10/2012 Yamanaka ........ F16H 61/66272
477/102
8,924,055 B2 * 12/2014 Shimodaira ......... B60L 11/1851
180/65.21

(Continued)

FOREIGN PATENT DOCUMENTS

JP    2003-200751 A    7/2003
JP    2003-267698 A    9/2003

(Continued)

*Primary Examiner* — Yonel Beaulieu
*Assistant Examiner* — Martin Weeks
(74) *Attorney, Agent, or Firm* — Foley & Lardner LLP (57) ABSTRACT

The driving force controller for an electric vehicle that controls driving force of a motor in the drive system of an electric vehicle includes: a target driving force setting unit for setting the target driving force based on a request from a driver; a dividing unit for computing a first motor torque command value by dividing the target driving force by a reduction ratio; a target acceleration computing unit for computing target acceleration by dividing the target driving force by inertia of the drive system; an actual acceleration computing unit for computing actual acceleration by differentiating actual rotational speed of the motor; a correction amount computing unit for computing a correction amount for reducing deviation between the target acceleration and the actual acceleration; and a command value computing unit for computing a second motor torque command value by adding the correction amount to the first motor torque command value.

4 Claims, 10 Drawing Sheets

(56) References Cited

U.S. PATENT DOCUMENTS

| | | |
|---|---|---|
| 2006/0017414 A1 | 1/2006 | Joe et al. |
| 2012/0081051 A1 | 4/2012 | Kobayashi et al. |
| 2013/0211652 A1* | 8/2013 | Shibata .................. B60K 6/48 |
| | | 701/22 |
| 2015/0012160 A1 | 1/2015 | Tsutsumi et al. |

FOREIGN PATENT DOCUMENTS

| | | |
|---|---|---|
| JP | 2006-050750 A | 2/2006 |
| JP | 2010-154638 A | 7/2010 |
| JP | 2012-080655 A | 4/2012 |
| JP | 2013-169054 A | 8/2013 |

\* cited by examiner

DRIVING FORCE CONTROLLER FOR ELECTRIC VEHICLE

TECHNICAL FIELD

The present invention relates to a driving force controller for an electric vehicle.

BACKGROUND ART

For a conventional driving force controller for an electric vehicle, a motor torque command value set based on a request from a driver (target driving force) is corrected to suppress a vibration (a torsional vibration) generated from a torsion of a drive system. For example, the driving force controller calculates vehicle speed as target vehicle speed, vehicle speed which is obtained when a motor torque command value is applied to an ideal vehicle model in which a drive system is assumed to be a rigid body that does not generate torsion. Then, the driving force controller obtains deviation between the target vehicle speed and actual vehicle speed, and calculates a correction value to reduce the deviation. The driving force controller thus obtains a final motor torque command value by adding the correction value to the motor torque command value.

In the conventional ideal vehicle model, disturbance torque such as: running resistance torque such as air resistance; and braking torque caused by braking, is not inputted. Thus, such disturbance torque is not reflected on the target vehicle speed outputted from the vehicle model and the correction value computed based on the target vehicle speed. As a result, although the torsional vibration can be suppressed by the correction value, there is a problem that the request from the driver and actual driving force are diverged because, at moments of running resistance generation and braking, such excessive driving force is generated as to cancel out the running resistance torque or the braking torque caused by braking.

As a method for suppressing such increase of the driving force resulting from the disturbance torque, an external input estimator has been proposed for estimating the disturbance torque, subtracting the disturbance torque from motor request torque in advance when computing the target vehicle speed, and computing the target vehicle speed with the disturbance torque taken into consideration (see Patent Literature 1).

CITATION LIST

Patent Literature

Patent Literature 1: Japanese Patent Application Publication No. 2012-80655

SUMMARY OF INVENTION

Technical Problem

However, in Patent Literature 1, the computation for estimating the disturbance torque by an input torque estimator is complicated. In addition, since the input torque estimator is an inverse system of a controlled object (a plant), it is difficult to accurately obtain a transfer function parameter of the plant that is used for estimating an input torque.

Solution to Problem

In view of the above problems, an object of the present invention is to provide an electric vehicle driving force controller capable of suppressing a divergence between the target driving force and the actual driving force at the moments of running resistance generation and braking with a simple configuration, while suppressing the torsional vibration generated in the drive system.

According to an aspect of the present invention, a driving force controller that controls driving force of a motor in a drive system of an electric vehicle includes: target driving force setting unit for setting the target driving force based on a request from a driver; dividing unit for computing a first motor torque command value by dividing the target driving force by a reduction ratio; target acceleration computing unit for computing target acceleration by dividing the target driving force by inertia of the drive system; actual acceleration computing unit for computing actual acceleration by differentiating actual rotational speed of the motor; correction amount computing unit for computing a correction amount for reducing deviation between the target acceleration and the actual acceleration; and command value computing unit for computing a second motor torque command value by adding the correction amount to the first motor torque command value.

Advantageous Effects of Invention

According to the present invention, it is possible to provide a driving force controller for an electric vehicle, which is capable of suppressing the divergence between the target driving force and the actual driving force at the moments of running resistance generation and braking with a simple configuration, while suppressing the torsional vibration generated in the drive system.

BRIEF DESCRIPTION OF DRAWINGS

FIG. 3 FIG. 3(a) is a graph showing a change of drive shaft torque at a moment of traveling with constant driving force according to the first embodiment of the present invention, and FIG. 3(b) is a graph showing a change of vehicle speed at the moment of traveling with constant driving force according to the first embodiment of the present invention.

FIG. 4 FIG. 4(a) is a graph showing a change of the drive shaft torque at a moment of braking after taking a foot off an accelerator according to the first embodiment of the present invention, and FIG. 4(b) is a graph showing a change of the vehicle speed at the moment of braking after taking the foot off the accelerator according to the first embodiment of the present invention.

FIG. 8 FIG. 8(a) is a graph showing temporal changes of the first motor torque command value and the second motor torque command value when there is the modeling error, according to the first embodiment of the present invention, and FIG. 8(b) is a graph showing temporal changes of the first motor torque command value and the second motor torque command value when there is the modeling error, according to the second embodiment of the present invention.

FIG. 9 FIG. 9(a) is a graph showing temporal changes of target acceleration and actual acceleration according to the first embodiment of the present invention, and FIG. 9(b) is a graph showing temporal changes of target acceleration and actual acceleration according to the second embodiment of the present invention.

FIG. 10 FIG. 10(a) is a graph showing temporal changes of deviation and a correction amount according to the first embodiment of the present invention, and FIG. 10(b) is a graph showing temporal changes of deviation and a correction amount according to the second embodiment of the present invention.

DESCRIPTION OF EMBODIMENTS

Next, first and second embodiments of the present invention will be described with reference to the drawings. In the following descriptions for the drawings, the same or similar parts are indicated by the same or similar reference signs.

[First Embodiment]

Figure 1:
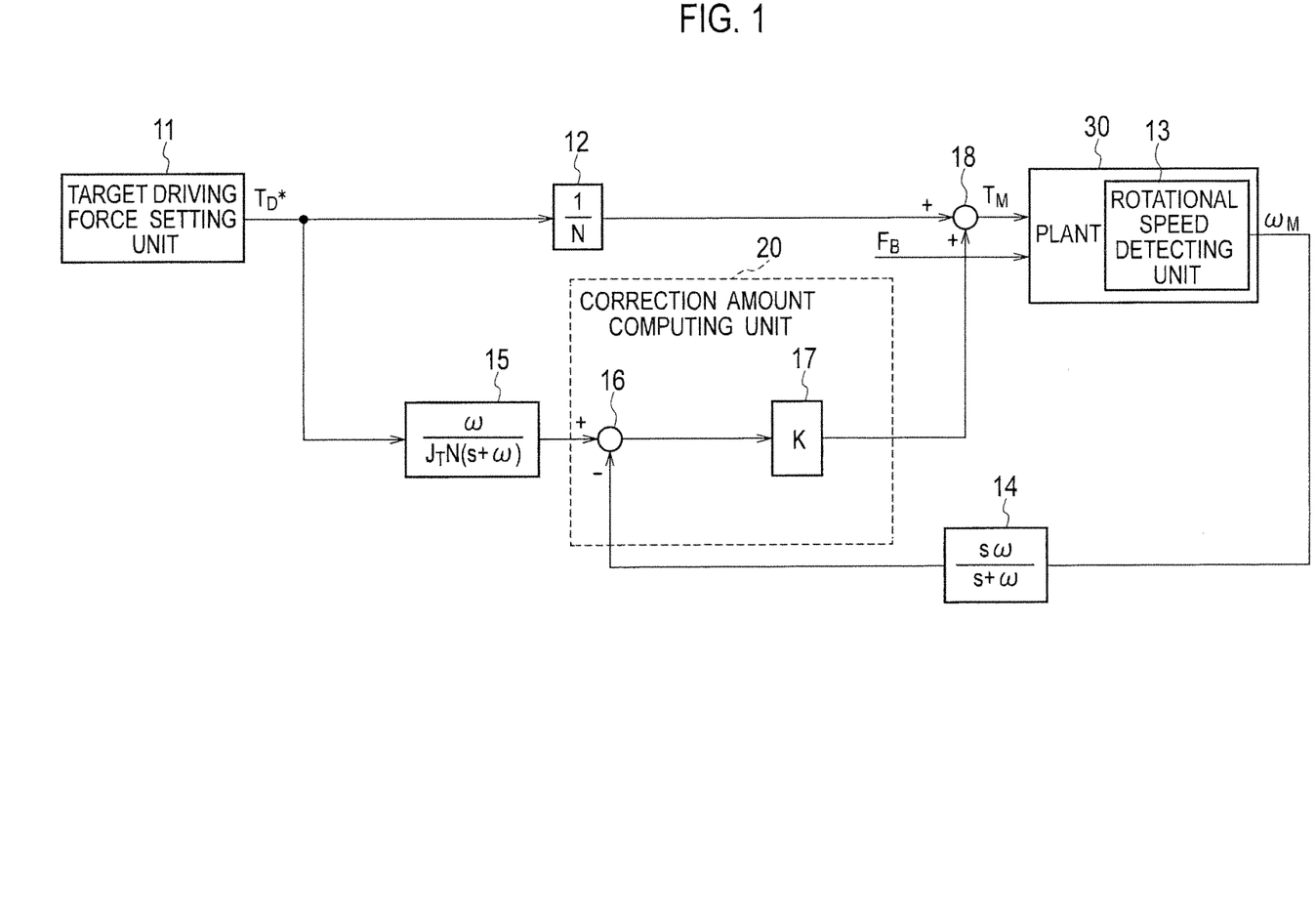
FIG. 1 is a block diagram showing an example of a configuration of a driving force controller according to a first embodiment of the present invention.

A driving force controller for an electric vehicle according to the first embodiment of the present invention can be mounted in an electric vehicle such as an electric drive vehicle (EV). As shown in FIG. 1, the driving force controller for an electric vehicle according to the first embodiment of the present invention includes target driving force setting unit 11, dividing unit 12, target acceleration computing unit 15, actual acceleration computing unit 14, correction amount computing unit 20, and command value computing unit 18. Each unit of the driving force controller for an electric vehicle according to the first embodiment of the present invention can be structured with a central processing unit (CPU), a memory, an operational circuit, and the like. The command value computing unit 18 is connected to a plant 30 that is a controlled object.

Figure 2:
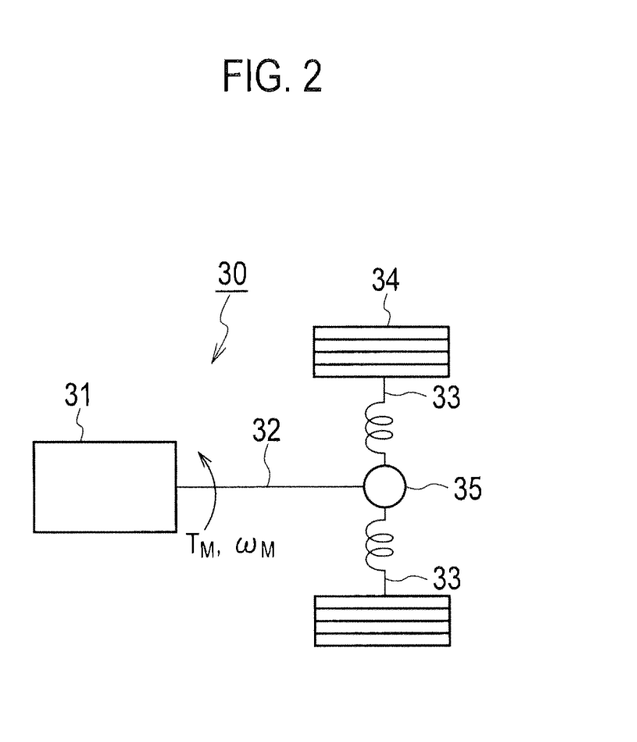
FIG. 2 is a schematic diagram for explaining a torsional vibration generated in a drive system.

The plant 30 is a drive system of the electric vehicle and includes a motor 31 and wheels 34 coupled to the motor 31 via an output shaft 32, a reduction gear 35, and drive shafts 33, as shown in FIG. 2. Rotations of the motor 31 are controlled by a motor torque command value $T_M$, which is computed by the command value computing unit 18 shown in FIG. 1. When the motor 31 rotates in the drive system of the electric vehicle, a vibration (a torsional vibration) is generated from torsion of the drive shafts 33. In FIG. 2, the torsion of the drive shafts 33 is schematically illustrated in spring shapes. To suppress the torsional vibration, correction is made when the command value computing unit 18 computes a motor torque command value.

The target driving force setting unit 11 shown in FIG. 1 sets target driving force $T_D^*$[Nm] corresponding to the request from the driver (an amount of how much pressing the accelerator). The target driving force $T_D^*$ diverges and is inputted to the dividing unit 12 and the target acceleration computing unit 15.

The dividing unit 12 converts the target driving force $T_D^*$, which is set by the target driving force setting unit 11, to motor torque by dividing by a reduction ratio N of the reduction gear 35. The target driving force $T_D^*/N$ after the division is a motor torque command value (a first motor torque command value) before the correction and is inputted to the command value computing unit 18. Note that the reduction ratio N differs for each vehicle and the reduction ratio N is 1 when not using a reduction gear. In that case, target driving force is equal to the motor torque command value ($T_D^*$).

The actual acceleration computing unit 14 is an approximate differentiator for obtaining acceleration by differentiating speed. The actual acceleration computing unit 14 computes rotational acceleration in reality (hereinafter, referred to as "actual acceleration") by differentiating rotational speed in reality (hereinafter, referred to as "actual rotational speed") $\omega_M$[rad/s] of the motor 31 in the plant 30. The actual rotational speed $\omega_M$ can be detected by rotational speed detecting unit (a rotational speed sensor) 13, which is mounted on the output shafts 32 of the motor 31 in the plant 30, for example.

A transfer characteristic (a transfer function) Ga(s) of actual acceleration computing unit 14 can be expressed, for example, as the following equation 1:

$$Ga(s) = \frac{s\omega}{s+\omega} \quad \text{[Equation 1]}$$

where $\omega$[rad/s] is a predetermined constant and a parameter for control, and s is a Laplace operator. $\omega/(s+\omega)$ included in the transfer function Ga(s) is a delay of an approximation of approximate differentiation for obtaining the acceleration. As $\omega$ becomes larger, the delay becomes smaller, making it more likely to obtain the true acceleration. However, when $\omega$ becomes too large, influence of a noise of a detection value of the rotational speed becomes large. Thus, balanced values are set for $\omega$. The actual acceleration computed by the actual acceleration computing unit 14 is inputted to the correction amount computing unit 20.

The target acceleration computing unit 15 computes rotational acceleration (hereinafter, referred to as "target acceleration") of a motor of an ideal vehicle model by dividing the target driving force $T_D^*$, which is set by the target driving force setting unit 11, by inertia $J_TN$ (product of a moment of inertia $J_T$ and the reduction ratio N) of the drive system. The ideal vehicle model is a model in which the vehicle drive system is assumed to have no backlash and have a perfect rigid body. A transfer function Gm(s) of the ideal vehicle model can be expressed, for example, as the following equation (2):

$$Gm(s) = \frac{\omega}{J_TN(s+\omega)} \quad \text{[Equation 2]}$$

where $\omega$[rad/s] is set as a value equal to $\omega$ in the above equation (1). $J_T$[Nms²] is total inertia (the moment of inertia) converted to a motor shaft, N is the reduction ratio of the reduction gear 35, and s is the Laplace operator. The moment of inertia $J_T$ and the reduction ratio N can be set properly, depending on the kind of the vehicle drive system, and the reduction ratio N is 1 when not using a reduction gear.

The total inertia (the moment of inertia) $J_T$ is a total of motor inertia, drive wheel inertia, vehicle weight, and on the like, and can be expressed, for example, as the following equation (3):

$$J_T = \frac{M \cdot R_t^2 + 2J_\omega}{N} + N \cdot J_m \qquad \text{[Equation 3]}$$

Here, $J_m$ is the motor inertia, $J_\omega$ is the drive wheel inertia, M is the vehicle weight, $R_t$ is the effective radius of a tire, and N is the reduction ratio.

The part $\omega/(s+\omega)$ included in the transfer function Gm(s) of the target acceleration computing unit 15 can be interpreted as delay compensation unit, which applies a delay that is identical with the delay of the approximation of the approximate differentiation when the acceleration is obtained by the actual acceleration computing unit 14. The target acceleration is inputted to the correction amount computing unit 20.

The correction amount computing unit 20 computes a correction amount for the first motor torque command value based on the target acceleration computed by the target acceleration computing unit 15 and the actual acceleration computed by the actual acceleration computing unit 14. The correction amount is for suppressing the torsional vibration generated in the drive system as mentioned above. The correction amount is computed for reducing the deviation between the target acceleration and the actual acceleration such that the deviation becomes 0 or small, and that a disturbance torque component is removed. Here, the disturbance torque component means a running resistance torque component such as air resistance, and a braking torque component caused by braking.

The correction amount computing unit 20 includes deviation computing unit 16 and proportional gain multiplying unit 17. The deviation computing unit 16 computes the deviation between the target acceleration and the actual acceleration by subtracting the actual acceleration computed by the actual acceleration computing unit 14 from the target acceleration computed by the target acceleration computing unit 15. The deviation between the target acceleration and the actual acceleration is inputted to the proportional gain multiplying unit 17. The proportional gain multiplying unit 17 computes the correction amount for suppressing the torsional vibration generated in the drive system by multiplying the deviation computed by the deviation computing unit 16 by a proportional gain K.

The command value computing unit 18 computes a final motor torque command value (a second motor torque command value) $T_M$[Nm] of the motor that drives the vehicle by adding the correction amount to the first motor torque command value computed by the dividing unit 12. The second motor torque command value $T_M$ is inputted to the plant 30 and motor torque is generated to coincide with or to follow the second motor torque command value $T_M$. Accordingly, the motor 31 is rotated. In addition, braking torque $F_B$[N] caused by braking of the driver is also inputted to the plant 30.

<First Operation Example>

For a first operation example, a simulation result of temporal changes of the target driving force, actual driving force, and vehicle speed when constant target driving force is continuously applied will be described.

Figure 3:
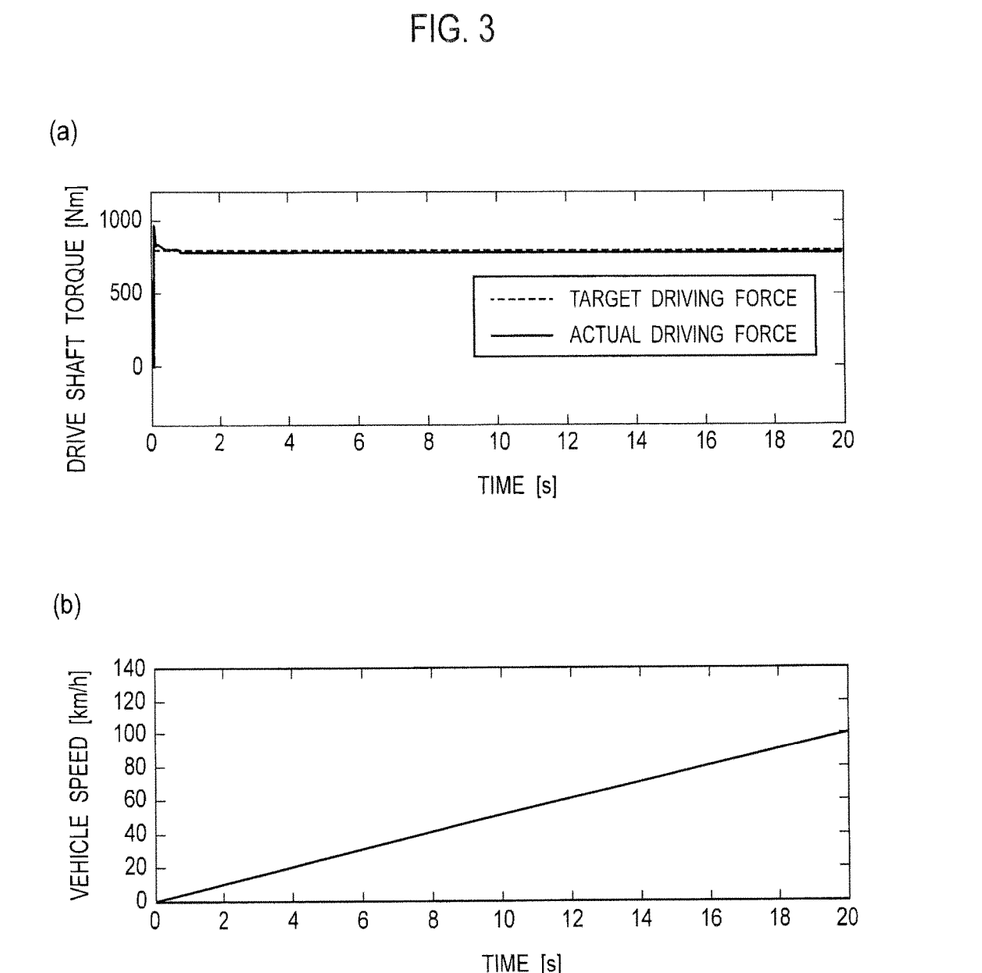

FIG. 3(a) shows the simulation result of the target driving force and the actual driving force when the constant target driving force is continuously applied in the configuration according to the first embodiment of the present invention, and FIG. 3(b) shows the simulation result of the vehicle speed in the same condition. Although the running resistance such as the air resistance increases with an increase of the vehicle speed over time as shown in FIGS. 3(a) and 3(b), it can be seen that a divergence between the target driving force and the actual driving force is small and the actual driving force follows the target driving force. Incidentally, even at an uphill, the vehicle can reduce the speed naturally as in the case where the vehicle speed increases.

<Second Operation Example>

For a second operation example, a simulation result of temporal changes of the target driving force, the actual driving force, and the vehicle speed when braking the vehicle with the configuration according to the first embodiment of the present invention will be described.

Figure 4:
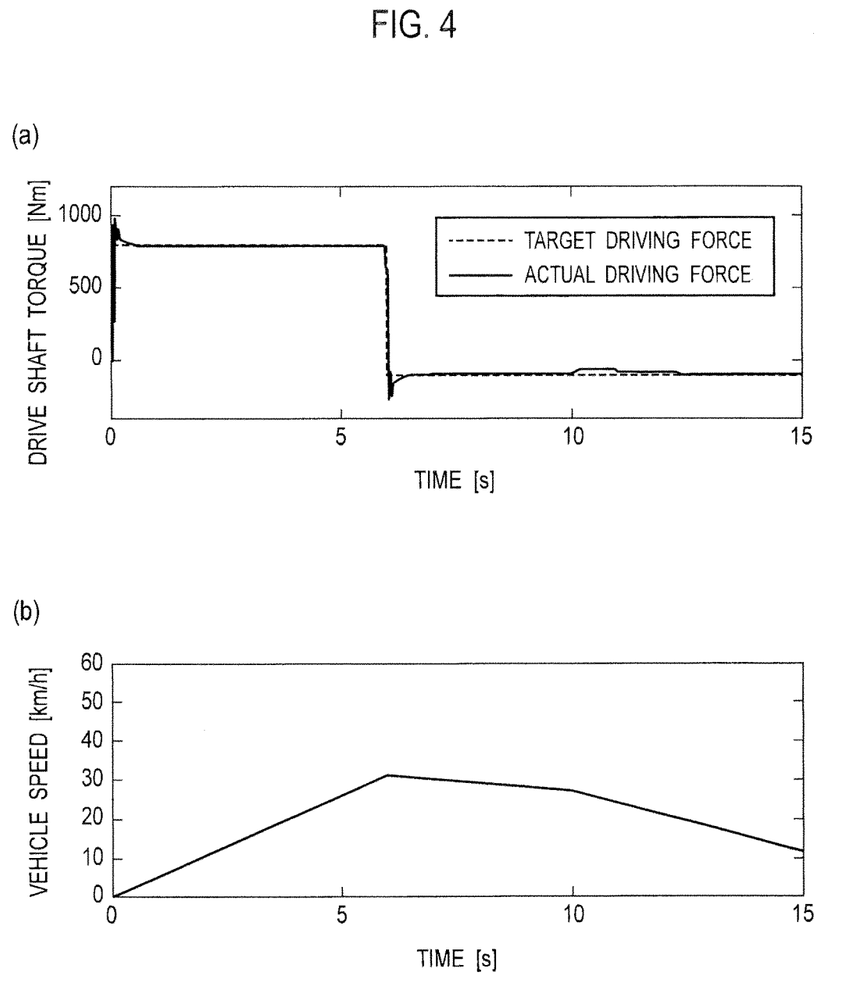

FIG. 4(a) shows the simulation result of the target driving force and the actual driving force when taking a foot off the accelerator at a point of 6 seconds and braking at a point of 10 seconds in the configuration according to the first embodiment of the present invention, and FIG. 4(b) shows the simulation result of the vehicle speed in the same condition. As shown in FIGS. 4(a) and 4(b), it can be seen that the divergence between the target driving force and the actual driving force is small and the actual driving force follows the target driving force even after the brake is applied at the point of 10 seconds.

As described above, the driving force controller for an electric vehicle according to the first embodiment of the present invention is capable of suppressing the torsional vibration generated in the drive system by computing the target acceleration using the ideal vehicle model, also computing the actual acceleration by differentiating the actual speed, and computing the correction amount for reducing the deviation between the target acceleration and the actual acceleration such that the deviation becomes 0 or smaller. In addition, since the disturbance torque component is removed from the correction amount, the driving force controller for an electric vehicle is capable of suppressing a torque variation resulting from the disturbance torque (an external speed variation factor), which is difficult to be identified, with a simple configuration without using such an input torque estimator as stated in Patent Literature 1, and thereby capable of suppressing the divergence between the target driving force and the actual driving force.

Moreover, in the conventional example stated in Patent Literature 1, correction torque is calculated from the deviation between the target rotational speed and the actual speed of the motor. On the other hand, in the first embodiment of the present invention, the correction amount is calculated from the deviation between the target acceleration and the actual acceleration. From this difference, although there is no disturbance torque estimating unit present in the conventional example, the driving force controller for an electric vehicle in the first embodiment of the present invention can make the actual driving force follow the target driving force with high accuracy.

[Second Embodiment]

In the first embodiment of the present invention, the inertia $J_T$ of the ideal vehicle model set for calculating the target acceleration includes the parameter such as the motor inertia and the vehicle weight. The vehicle weight, for example, tends to vary depending on the number of occupants and a load capacity, and thus makes a modeling error likely to occur. When error has occurred in the inertia $J_T$ of the ideal vehicle model, the correction amount has a certain value even in a normal state where no torsional vibration is generated. Therefore, a difference may be generated between the target driving force $T_D^*$ determined by an operation of the driver and the actual driving force and thereby strangeness may occur in the acceleration. In addition, in the first embodiment of the present invention, an influence of the modeling error may not be removed completely.

Here, a mechanism with which the correction amount has a value in the normal state even when the modeling error occurs will be described. Assuming that the configuration according to the first embodiment of the present invention is in the normal state without the torsion and the inertia of the plant 30 is $J_{TP}$ with the same idea of the ideal vehicle model, the actual rotational speed $\omega_M$ can be expressed as the following equation (4):

$$\omega_M = \frac{1}{J_{TP} \cdot s} T_M \quad [\text{Equation 4}]$$

Then, actual acceleration α1 calculated by the actual acceleration computing unit 14 can be expressed as the following equation (5):

$$\alpha 1 = \frac{s\omega}{s+\omega} \frac{1}{J_{TP} \cdot s} T_M = \frac{\omega}{s+\omega} \frac{1}{J_{TP}} T_M \quad [\text{Equation 5}]$$

Since s→0 in the normal state, the actual acceleration α1 can be expressed as the following equation (6):

$$\alpha 1 = \frac{1}{J_{TP}} T_M \frac{\omega}{\omega} = \frac{1}{J_{TP}} T_M \quad [\text{Equation 6}]$$

Likewise, target acceleration α2 calculated by the target acceleration computing unit 15 can be expressed as the following equation (7):

$$\alpha 2 = \frac{1}{J_T N} \frac{\omega}{s+\omega} T_D^* \quad [\text{Equation 7}]$$

Since s→0 in the normal state, the target acceleration α2 can be expressed as the following equation (8):

$$\alpha 2 = \frac{1}{J_T N} T_D^* \quad [\text{Equation 8}]$$

Therefore, the deviation between the target acceleration α2 and the actual acceleration α1 computed by the deviation computing unit 16 can be expressed as the following equation (9):

$$\alpha 2 - \alpha 1 = \frac{1}{J_T N} T_D^* - \frac{1}{J_{TP}} T_M \quad [\text{Equation 9}]$$

Accordingly, when there is no modeling error and a value obtained by dividing the target driving force $T_D^*$ by the reduction ratio N (that is, the first motor torque command value) and the second motor torque command value $T_M$ are equal to each other, the deviation between the target acceleration α2 and the actual acceleration α1 becomes 0, and thus the correction amount also becomes 0. On the other hand, when there is a modeling error, the deviation between the target acceleration α2 and the actual acceleration α1 has a value, and thus the correction amount also has a value.

Figure 5:
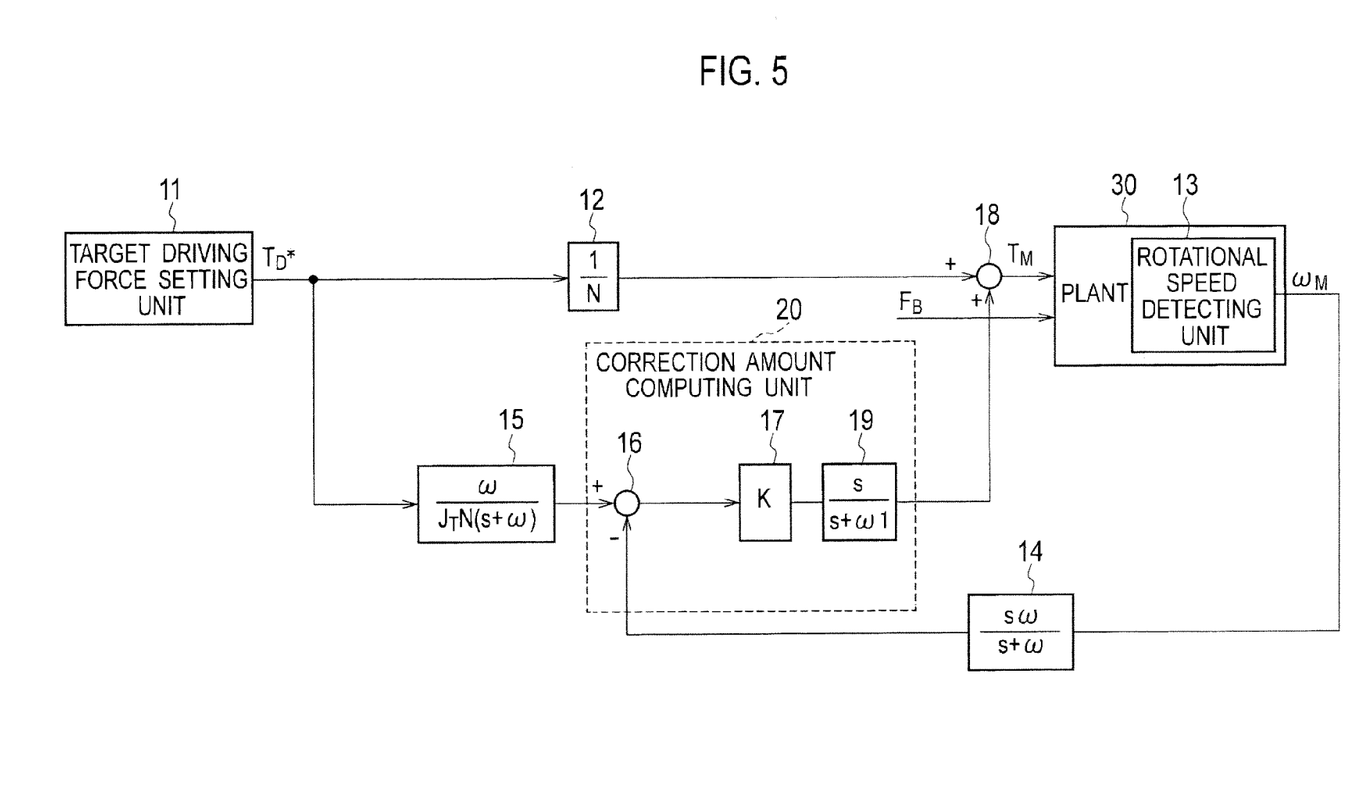
FIG. 5 is a block diagram showing an example of a configuration of a driving force controller according to a second embodiment of the present invention.

Given the circumstances, the driving force controller for an electric vehicle according to the second embodiment of the present invention differs from the configuration according to the first embodiment of the present invention in that modeling error suppressing unit 19 is added to a later stage of the proportional gain multiplying unit 17 as shown in FIG. 5. The other configuration of the driving force controller for an electric vehicle according to the second embodiment of the present invention is substantially the same as the configuration according to the first embodiment of the present invention.

The modeling error suppressing unit 19 includes, for example, a high-pass filter, and computes a final correction amount (a second correction amount) by making a higher region of a correction amount (a first correction amount) computed by the proportional gain multiplying unit 17 pass through, cutting off a lower region of the correction amount, and thereby suppressing the modeling error included in the first correction amount.

A transfer function Gh(s) of the modeling error suppressing unit 19 can be expressed, for example, as the following equation (10):

$$Gh(s) = \frac{s}{s+\omega 1} \quad [\text{Equation 10}]$$

In the equation (10), s is the Laplace operator and ω1[rad/s] is a cut-off frequency. The cut-off frequency ω1 can be set properly, for example, to 0.3 Hz.

<First Operation Example>

Next, simulation results of cases where the modeling error occurs or not in the configurations according to the first and second embodiments of the present invention will be described with reference to FIGS. 6 and 7. For conditions of the simulations, the target driving force is varied from 0 Nm to 100 Nm and thereby the modeling error is generated. The modeling error is assumed by setting the vehicle weight for the total inertia $J_T$ of the ideal vehicle model with two occupants (65 kg×2) and by setting the vehicle weight for the plant 30 with five occupants (65 kg×5) and 200 kg of the load capacity. The amount of the modeling error is thus such a model that the plant 30 is 395 kg heavier than that for the total inertia $J_T$ of the ideal vehicle model.

Figure 6:
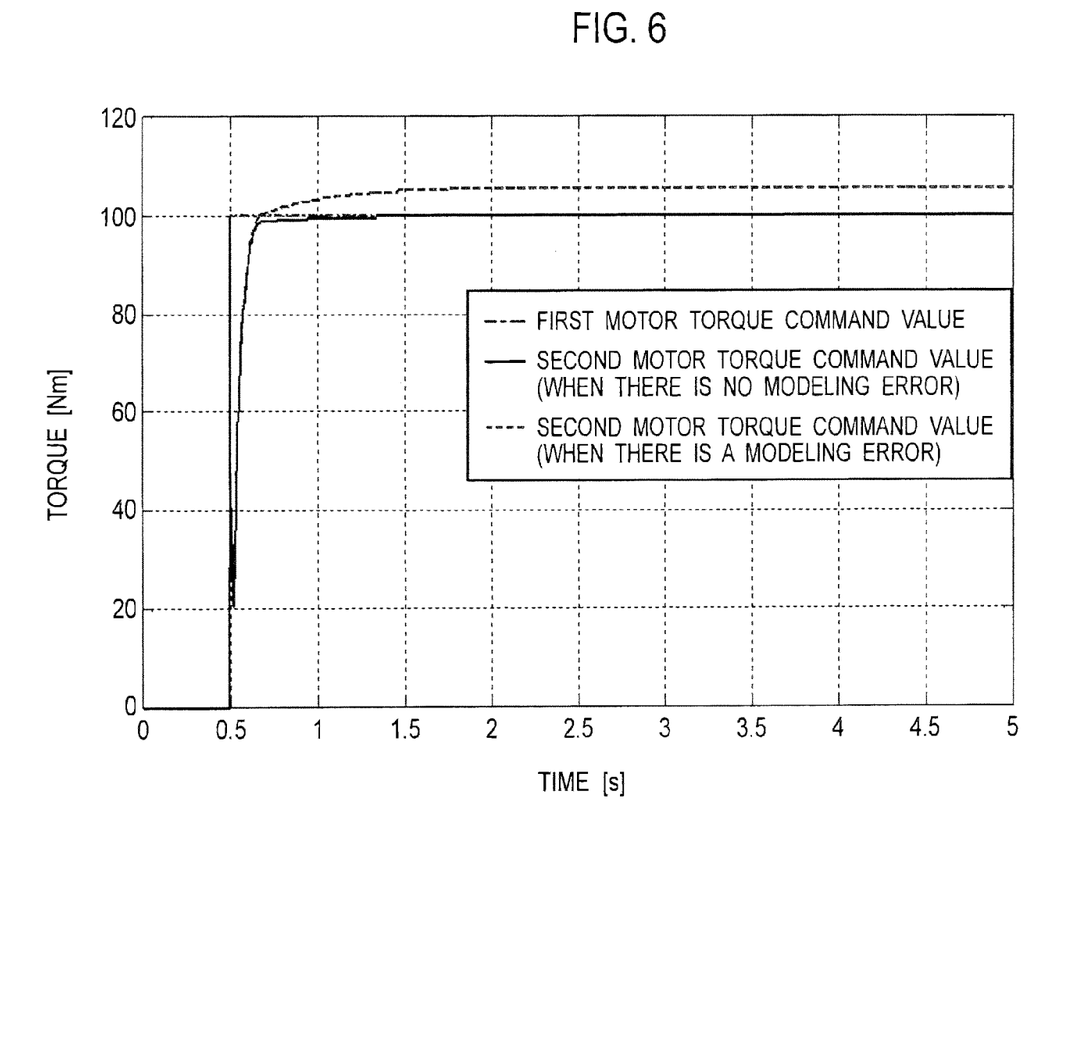
FIG. 6 is a graph showing temporal changes of a first motor torque command value, a second motor torque command value when there is no modeling error, and the second motor torque command value when there is a modeling error, according to the first embodiment of the present invention.

FIG. 6 is a graph showing temporal changes of the value (the first motor torque command value) $T_D^*$/N obtained by converting the target driving force $T_D^*$ to the motor torque, the final motor torque command value (the second motor torque command value) $T_M$ when there is no modeling error, and the second motor torque command value $T_M$ when there is the modeling error, according to the first embodiment of the present invention. As shown in FIG. 6, when there is no modeling error, it can be seen that the second motor torque command value $T_M$ coincides with the first motor torque command value $T_D^*$/N after a certain time elapsed. On the other hand, when there is the modeling error, it can be seen that the second motor torque command value $T_M$ becomes different from the first motor torque command value $T_D^*$/N.

Figure 7:
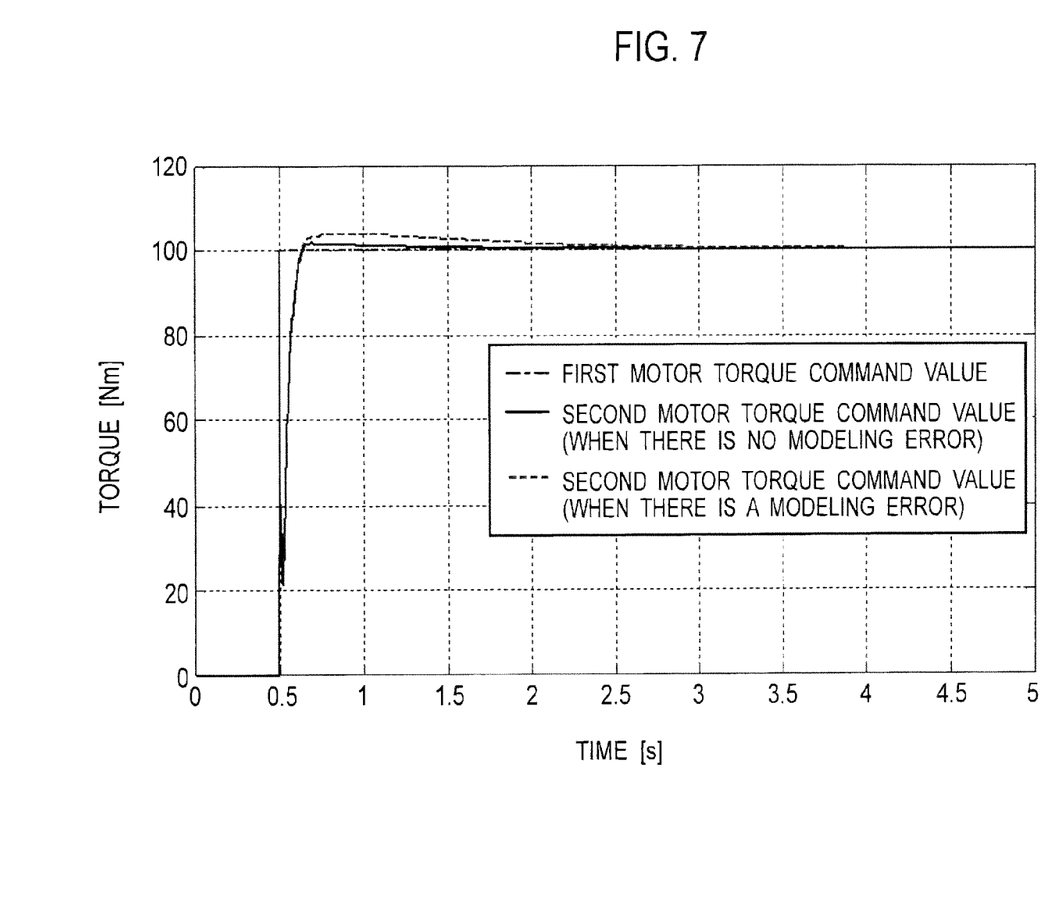
FIG. 7 is a graph showing temporal changes of a first motor torque command value, a second motor torque command value when there is no modeling error, and the motor torque command value when there is a modeling error, according to the second embodiment of the present invention.
Figure 8:
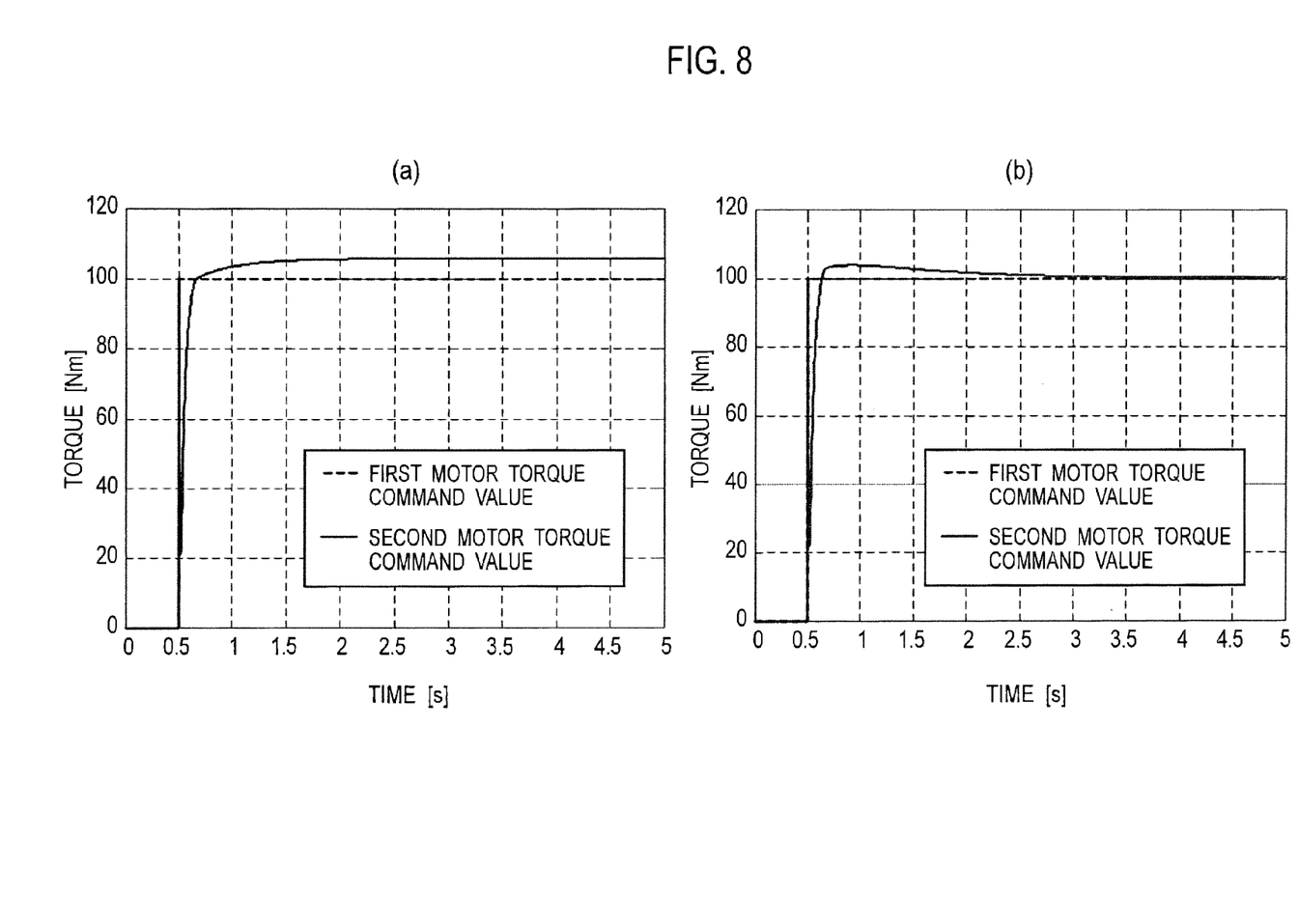
Figure 9:
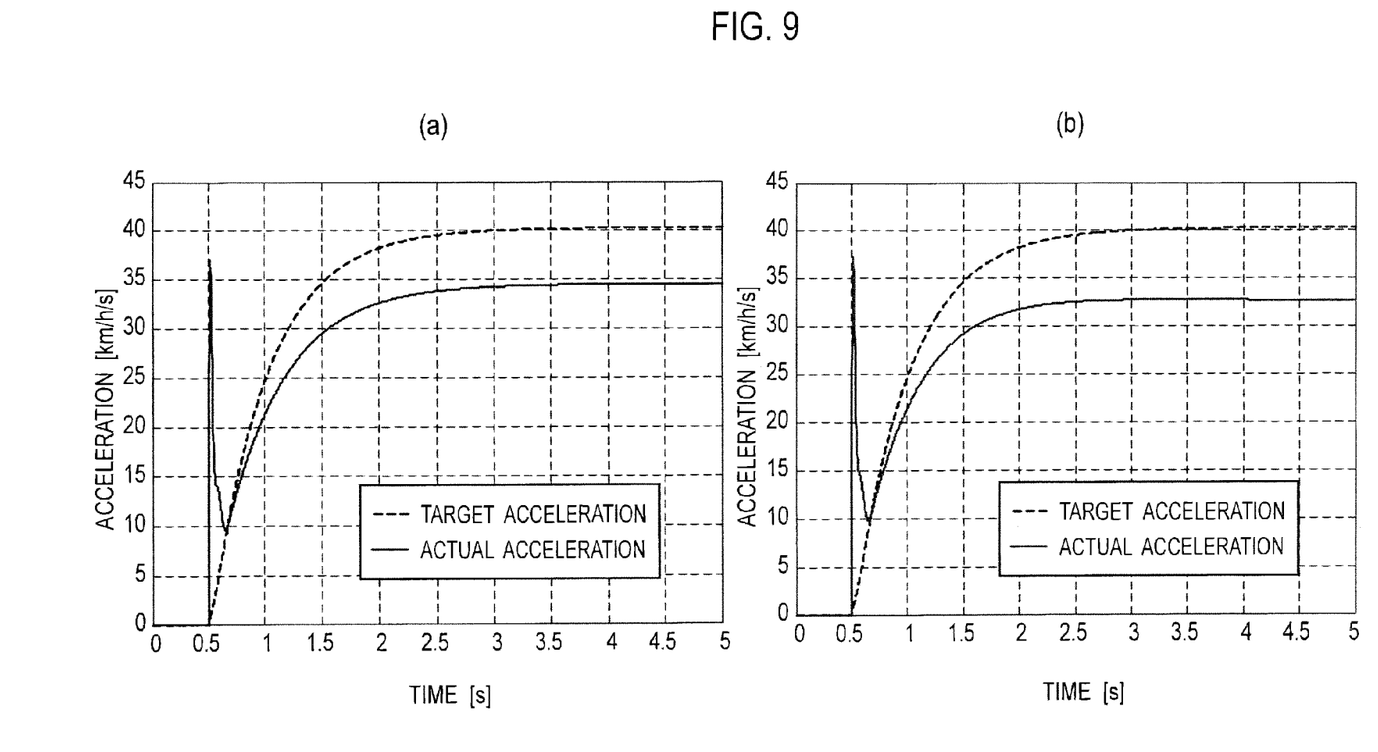
Figure 10:
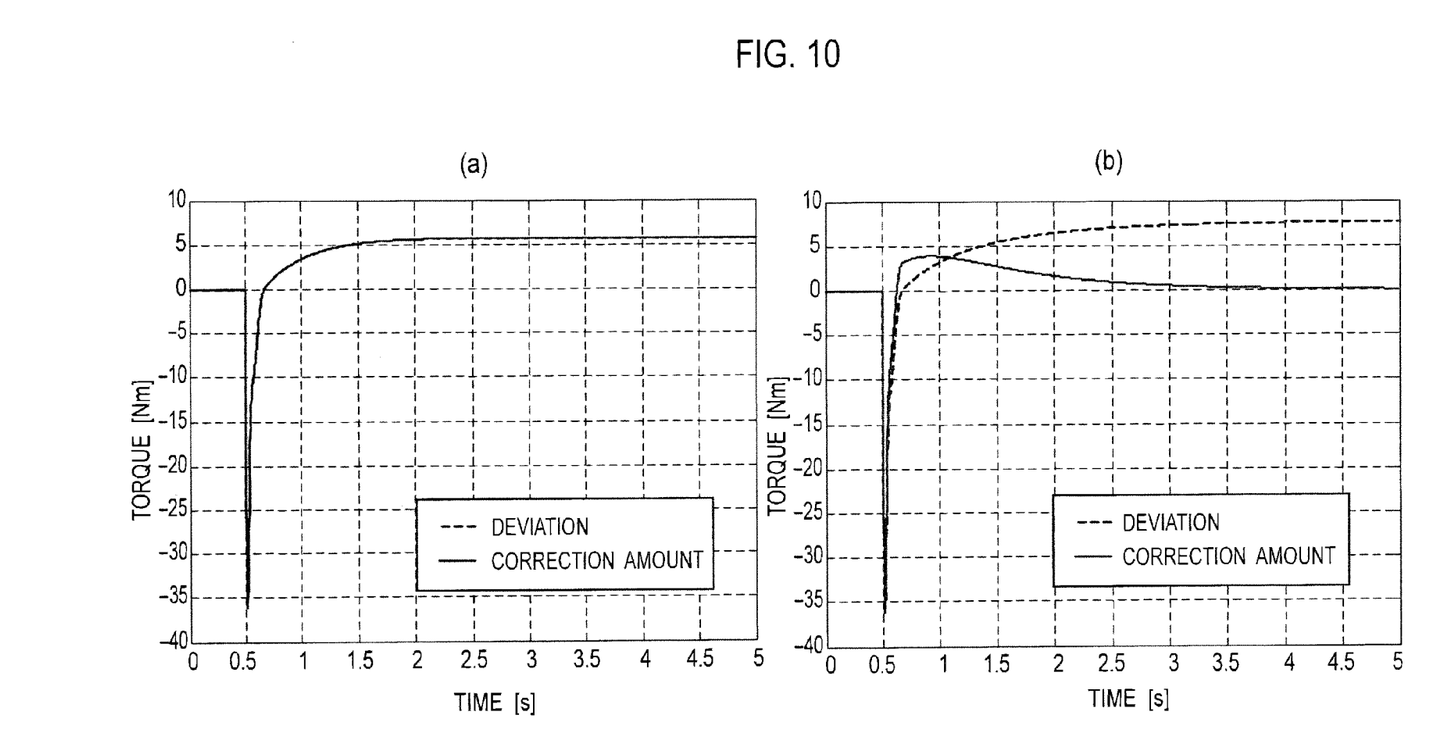

FIG. 7 is a graph showing temporal changes of the first motor torque command value $T_D^*$/N, the second motor torque command value $T_M$ when there is no modeling error, and the second motor torque command value $T_M$ when there is the modeling error, according to the second embodiment of the present invention. As shown in FIG. 7, when there is no modeling error, it can be seen that the second motor torque command value $T_M$ coincides with the first motor torque command value $T_D^*/N$ after a certain time elapsed. On the other hand, when there is the modeling error, it also can be seen that the second motor torque command value $T_M$ coincides with the first motor torque command value $T_D^*/N$ after a certain time elapsed.

<Second Operation Example>

Next, simulation results of cases of an output value of each control circuit when there is the modeling error in the configurations according to the first and second embodiments of the present invention will be described with reference to FIGS. 8(a) to 10(b). The conditions of the simulations are identical with that of the first operation example.

FIG. 8(a) is a graph showing temporal changes of the first motor torque command value $T_D^*/N$ and the second motor torque command value $T_M$ when there is the modeling error according to the first embodiment of the present invention. FIG. 8(b) is a graph showing temporal changes of the first motor torque command value $T_D^*/N$ and the second motor torque command value $T_M$ when there is the modeling error according to the second embodiment of the present invention. As shown in FIG. 8(a), it can be seen that the second motor torque command value $T_M$ becomes a different value from the first motor torque command value $T_D^*/N$ in the configuration according to the first embodiment of the present invention. On the other hand, as shown in FIG. 8(b), it can be seen that the second motor torque command value $T_M$ coincides with the first motor torque command value $T_D^*/N$ after a certain time elapsed in the configuration according to the second embodiment of the present invention.

FIG. 9(a) is a graph showing temporal changes of the target acceleration and the actual acceleration according to the first embodiment of the present invention. FIG. 9(b) is a graph showing temporal changes of the target acceleration and the actual acceleration according to the second embodiment of the present invention. As shown in each of FIGS. 9(a) and 9(b), it can be seen that the target acceleration and the actual acceleration become constant values after a certain time elapsed in the configurations according to the first and second embodiments of the present invention.

FIG. 10(a) is a graph showing temporal changes of the deviation computed by the deviation computing unit 16 and the correction amount computed from the deviation passed through the proportional gain multiplying unit 17 in the configuration according to the first embodiment of the present invention. FIG. 10(b) is a graph showing temporal changes of the deviation computed by the deviation computing unit 16 and the correction amount computed from the deviation passed through the proportional gain multiplying unit 17 and the modeling error suppressing unit 19 in the configuration according to the second embodiment of the present invention. As shown in FIG. 10(a), it can be seen that the correction amount passed through the proportional gain multiplying unit 17 has a constant value in the configuration according to the first embodiment of the present invention. On the other hand, as shown in FIG. 10(b), it can be seen that the correction amount passed through the modeling error suppressing unit 19 becomes 0 after a certain time elapsed in the configuration according to the second embodiment of the present invention.

As described above, as with the first embodiment of the present invention, the driving force controller for an electric vehicle according to the second embodiment of the present invention is capable of suppressing the torsional vibration generated in the drive system by computing the target acceleration by using the ideal vehicle model, also computing the actual acceleration by differentiating the actual speed, and computing the correction amount for reducing the deviation between the target acceleration and the actual acceleration such that the deviation becomes 0 or small. In addition, since the disturbance torque component is removed from the correction amount, the driving force controller for an electric vehicle is capable of suppressing the torque variation resulting from the disturbance torque (an external speed variation factor), which is difficult to be identified, with the simple configuration without using such an input torque estimator as stated in Patent Literature 1, and thereby capable of suppressing the divergence between the target driving force and the actual driving force.

Moreover, because the modeling error suppressing unit 19 is added, the driving force controller for an electric vehicle according to the second embodiment of the present invention is capable of suppressing the influence of the modeling error in the normal state and omitting the correction amount even when the modeling error occurs. Therefore, the first motor torque command value $T_D^*/N$ and the second motor torque command value $T_M$ can be made to coincide with each other, and thereby the strangeness in the acceleration is prevented. Furthermore, because the modeling error suppressing unit 19 is added, remaining disturbance torque that cannot be removed in the first embodiment of the present invention can be removed.

Incidentally, in FIG. 5, although the modeling error suppressing unit 19 is added to the later stage of the proportional gain multiplying unit 17, the modeling error suppressing unit 19 may be added to a former stage of the proportional gain multiplying unit 17.

[Other Embodiment]

Although the first and second embodiments of the present invention have been described as above, the description and the drawings constituting part of this disclosure should not be understood as limiting the present invention. From this disclosure, various modifications, examples, and operational techniques will be apparent to those skilled in the art. As a matter of course, the present invention encompasses various embodiments and the like that are not stated in this disclosure. Therefore, the technical scope of the present invention is defined by only the invention-specifying matters according to the claims, appropriate from the above descriptions.

REFERENCE SIGNS LIST 11 target driving force setting unit
12 dividing unit
13 rotational speed detecting unit
14 actual acceleration computing unit
15 target acceleration computing unit
16 deviation computing unit
17 proportional gain multiplying unit
18 command value computing unit
19 modeling error suppressing unit
20 correction amount computing unit
30 plant
31 motor
32 output shaft
33 drive shafts
34 wheels
35 reduction gear

The invention claimed is:

1. A driving force controller that controls driving force of a motor in a drive system of an electric vehicle, comprising:

target driving force setting unit for setting target driving force based on a request from a driver;

dividing unit for computing a first motor torque command value by dividing the target driving force by a reduction ratio;

target acceleration computing unit for computing target acceleration based on the target driving force, by using a first transfer characteristic in which the target driving force is divided by inertia of the drive system and multiplied by a predetermined delay value;

actual acceleration computing unit for computing actual acceleration based on actual rotational speed of the motor, by using a second transfer characteristic in which derivative of the actual rotational speed of the motor is multiplied by the predetermined delay value;

correction amount computing unit for computing a correction amount for reducing deviation between the target acceleration and the actual acceleration; and command value computing unit for computing a second motor torque command value by adding the correction amount to the first motor torque command value.

2. The driving force controller for an electric vehicle according to claim 1, wherein the predetermined delay value is expressed by $\omega/(s+\omega)$ where $\omega$ denotes a predetermined angular acceleration and s denotes a Laplace variable corresponding to time.

3. The driving force controller for an electric vehicle according to claim 1, further comprising modeling error suppressing unit for suppressing a modeling error of the drive system before the correction amount is added to the first motor torque command value, the modeling error being included in the correction amount.

4. The driving force controller for an electric vehicle according to claim 2, further comprising modeling error suppressing unit for suppressing a modeling error of the drive system before the correction amount is added to the first motor torque command value, the modeling error being included in the correction amount.

* * * * *